United States Patent
Mora López et al.

(10) Patent No.: US 10,783,193 B2
(45) Date of Patent: Sep. 22, 2020

(54) PROGRAM, METHOD, AND SYSTEM FOR EXECUTION OF SOFTWARE SERVICES

(71) Applicant: FUJITSU LIMITED, Kawasaki-shi, Kanagawa (JP)

(72) Inventors: José Mora López, Madrid (ES); Victor De La Torre, Madrid (ES); Masatomo Goto, London (GB)

(73) Assignee: FUJITSU LIMITED, Kawasaki (JP)

( * ) Notice: Subject to any disclaimer, the term of this patent is extended or adjusted under 35 U.S.C. 154(b) by 335 days.

(21) Appl. No.: 15/679,353

(22) Filed: Aug. 17, 2017

(65) Prior Publication Data

US 2018/0113940 A1   Apr. 26, 2018

(30) Foreign Application Priority Data

Oct. 21, 2016   (DE) ........................ 10 2016 220 779

(51) Int. Cl.
*G06F 16/90*   (2019.01)
*G06F 16/951*   (2019.01)
(Continued)

(52) U.S. Cl.
CPC .............. *G06F 16/951* (2019.01); *G06F 9/46* (2013.01); *G06F 16/00* (2019.01); *G06F 16/9024* (2019.01)

(58) Field of Classification Search
None
See application file for complete search history.

(56) References Cited

U.S. PATENT DOCUMENTS

| 4,068,300 A | 1/1978 | Bachman |
| 6,961,736 B1 | 11/2005 | Amirghodsi |

(Continued)

FOREIGN PATENT DOCUMENTS

| CA | 2883922 A1 | 8/2011 |
| CN | 101262374 A | 9/2008 |

(Continued)

OTHER PUBLICATIONS

US 9,299,346 B1, 03/2016, Hart et al. (withdrawn)
(Continued)

*Primary Examiner* — Kristopher Andersen
(74) *Attorney, Agent, or Firm* — Westerman, Hattori, Daniels & Adrian, LLP

(57) ABSTRACT

A software service execution system includes: a software library storing software services, each obtaining and processing input data from a specified input URI (uniform resource identifier) and outputting the result to a specified output URI; a metadata graph representing the software services, each being identifiable by a predicate defining a relationship between a subject vertex and an object vertex, the subject vertex storing the specified input URI and being linked by a directed edge labelled with the predicate to the object vertex storing the specified output URI; a metadata graph query interface receiving a query requesting a queried vertex, linked by a defined traversal path along one or more edges to a source vertex; a software service execution controller controlling the execution of the software services identified by specified predicates labelling edges on the defined traversal path, in an order determined by the defined traversal path.

10 Claims, 4 Drawing Sheets

(51) Int. Cl.
  *G06F 16/901* (2019.01)
  *G06F 9/46* (2006.01)
  *G06F 16/00* (2019.01)

(56) References Cited

U.S. PATENT DOCUMENTS

| | | |
|---|---|---|
| 7,433,835 B2 | 10/2008 | Frederick et al. |
| 7,584,152 B2 | 9/2009 | Gupta et al. |
| 7,617,174 B2 | 11/2009 | Chen et al. |
| 7,734,515 B1 | 6/2010 | Frederick et al. |
| 7,912,763 B1 | 3/2011 | Frederick et al. |
| 8,019,652 B1 | 9/2011 | Frederick et al. |
| 8,019,653 B1 | 9/2011 | Frederick et al. |
| 8,036,261 B2 | 10/2011 | Tsutsui et al. |
| 8,312,426 B2 | 11/2012 | Bouillet et al. |
| 8,391,590 B2 | 3/2013 | Yalla et al. |
| 8,788,269 B2 | 7/2014 | Stifelman et al. |
| 9,064,006 B2 | 6/2015 | Hakkani-Tur et al. |
| 9,268,617 B1 | 2/2016 | Croteau et al. |
| 9,299,331 B1 | 3/2016 | Durham et al. |
| 9,753,744 B1* | 9/2017 | Wells ............... G06F 9/546 |
| 2002/0083060 A1 | 6/2002 | Wang et al. |
| 2004/0107821 A1 | 6/2004 | Alcalde et al. |
| 2005/0060350 A1 | 3/2005 | Baum et al. |
| 2005/0165656 A1 | 7/2005 | Frederick et al. |
| 2005/0177372 A1 | 8/2005 | Wang et al. |
| 2006/0013451 A1 | 1/2006 | Haitsma |
| 2006/0136428 A1 | 6/2006 | Syeda-Mahmood |
| 2006/0206883 A1* | 9/2006 | Sabbouh ............ G06F 16/972 717/146 |
| 2008/0208855 A1 | 8/2008 | Lingenfelder et al. |
| 2009/0277322 A1 | 11/2009 | Cai et al. |
| 2011/0314375 A1 | 12/2011 | Zaika et al. |
| 2012/0016678 A1 | 1/2012 | Gruber et al. |
| 2013/0019285 A1 | 1/2013 | Barborak et al. |
| 2013/0054244 A1 | 2/2013 | Bao et al. |
| 2013/0097320 A1 | 4/2013 | Ritter et al. |
| 2013/0117207 A1 | 5/2013 | Kim et al. |
| 2013/0144876 A1 | 6/2013 | Mehanna et al. |
| 2013/0151451 A1 | 6/2013 | Lee et al. |
| 2013/0246454 A1 | 9/2013 | Menten |
| 2013/0275164 A1 | 10/2013 | Gruber et al. |
| 2013/0311997 A1 | 11/2013 | Gruber et al. |
| 2014/0149104 A1 | 5/2014 | Kim et al. |
| 2014/0201629 A1 | 7/2014 | Heck |
| 2014/0280616 A1 | 9/2014 | Ramanathan et al. |
| 2014/0310127 A1 | 10/2014 | Hoch et al. |
| 2014/0337358 A1 | 11/2014 | Mitra et al. |
| 2014/0337814 A1 | 11/2014 | Kalns et al. |
| 2014/0344439 A1 | 11/2014 | Kempf et al. |
| 2014/0365885 A1 | 12/2014 | Carson et al. |
| 2015/0245216 A1 | 8/2015 | Cohen et al. |
| 2015/0271276 A1 | 9/2015 | Edlund et al. |
| 2015/0348554 A1 | 12/2015 | Orr et al. |
| 2015/0382079 A1 | 12/2015 | Lister et al. |
| 2016/0026680 A1 | 1/2016 | Banerjee et al. |
| 2016/0026913 A1 | 1/2016 | Moon et al. |
| 2016/0044380 A1 | 2/2016 | Barrett |
| 2016/0048771 A1 | 2/2016 | Chen et al. |
| 2016/0062604 A1 | 3/2016 | Kraljic et al. |
| 2016/0063874 A1 | 3/2016 | Czerwinski et al. |
| 2016/0063989 A1 | 3/2016 | Deleeuw |
| 2016/0063998 A1 | 3/2016 | Krishnamoorthy et al. |
| 2016/0070580 A1 | 3/2016 | Johnson et al. |
| 2016/0140172 A1 | 5/2016 | Bornea et al. |
| 2017/0006116 A1 | 1/2017 | Kelly et al. |
| 2018/0039567 A1* | 2/2018 | Rajagopalan ....... G06F 11/3672 |
| 2018/0075115 A1 | 3/2018 | Murray et al. |

FOREIGN PATENT DOCUMENTS

| | | |
|---|---|---|
| CN | 103038738 A | 4/2013 |
| CN | 104202416 A | 12/2014 |
| CN | 105164719 A | 12/2015 |
| CN | 105357143 A | 2/2016 |
| DE | 102012019178 A1 | 4/2013 |
| EP | 2325837 A2 | 5/2011 |
| EP | 2618280 A1 | 7/2013 |
| EP | 2704029 A1 | 3/2014 |
| EP | 2894587 A1 | 7/2015 |
| EP | 3041198 A1 | 7/2016 |
| GB | 2495222 A | 4/2013 |
| IN | 7309DEN2014 A | 4/2015 |
| IN | 359CH2013 A | 8/2015 |
| KR | 10-2012-0052610 A | 5/2012 |
| KR | 10-2013-0050707 A | 5/2013 |
| KR | 10-2013-0064960 A | 6/2013 |
| KR | 10-2014-0066640 A | 6/2014 |
| TW | 201543243 A | 11/2015 |
| TW | 201544974 A | 12/2015 |
| TW | 201545504 A | 12/2015 |
| WO | 2004/107217 A1 | 12/2004 |
| WO | 2008/015417 A1 | 2/2008 |
| WO | 2015/191965 A2 | 12/2015 |
| WO | 2016/049437 A1 | 3/2016 |
| WO | 2016/105624 A1 | 6/2016 |

OTHER PUBLICATIONS

Non-Final Office Action dated Jan. 28, 2019, issued in U.S. Appl. No. 15/679,296 (43 pages).
Search Report dated Aug. 2, 2017, issued in German Application No. 10 2016 220 778.4, with English translation (13 pages).
Kutter M: SOAP-WSDL-1.27. On the Internet <URL:>http://search.cpan.org/-mkutter/SOAP-WSDL-1.27/lib/SOAP/WSDL.pmzw. <http://web.archive.org/web/20150130084326/http://search.cpan.org/-mkutter/SOAP-WSDL-1.27/lib/SOAP/WSDLpm>; Cited in German Search Report dated Aug. 2, 2017.
Search Report dated Aug. 9, 2017, issued in German Application No. 10 2016 220 782.2, with English translation (14 pages).
Siddiqui et al., "Semantic-based On-demand Synthesis of Grid Activities for Automatic Workflow Generation", Third IEEE International Conference on e-Science and Grid Computing, IEEE Computer Society, 2007, pp. 43-50; Cited in German Search Report dated Aug. 9, 2017.
Badica et al., "Rule-based Distributed and Agent Systems", Rule-Based Reasoning, Programming, and Applications, 2011, p. 3-28; Cited in German Search Report dated Aug. 9, 2017.
Ferrara et al., "Automatic Identity Recognition in the Semantic Web," International Workshop on Identity and Reference on the Semantic Web, vol. 422. CEUR, 2008 (15 pages).
Cornillon et al., "OPeNDAP: Accessing Data in a Distributed, Heterogeneous Environment," Data Science Journal, vol. 2, Nov. 5, 2003, pp. 164-174.
Bremm et al., "Assisted Descriptor Selection Based on Visual Comparative Data Analysis," Computer Graphics Forum, vol. 30, No. 3, 2011 (10 pages).
Wang, "An Industrial-Strength Audio Search Algorithm," Ismir, vol. 2003, Oct. 2003 (7 pages).
Boutemedjet et al., "Unsupervised Feature Selection for Accurate Recommendation of High-Dimensional Image Data," Advances in Neural Information Processing Systems, 2008 (8 pages).
"UCI Machine Learning Repository: Corel Image Features Data Set," https://archive.ics.uci.edu/ml/support/Corel+Image+Features [accessed Jun. 2, 2017] (3 pages).
"TechTC—Technion Repository of Text Categorization Datasets," http://techtc.cs.technion.ac.il/ [acccessed Jun. 2, 2017] (7 pages).
Ison et al., "Tools and data services registry: a community effort to document bioinformatics resources," Nucleic Acids Research, 2016, vol. 44, Nov. 2015, D38-D47.
Maleshkova et al., "Supporting the creation of semantic RESTful service descriptions," The Open University, 8th International Semantic Web Conference (ISWC 2009), Oct. 2009 (15 pages).
Prud'Hommeaux et al., "SPARQL Query Language for RDF," W3C Recommendation Jan. 15, 2008 (74 pages).
Fielding et al., "Architectural Styles and the Design of Network-based Software Architectures," Doctoral dissertation: University of California, Irvine, 2000 (180 pages).

(56) References Cited

OTHER PUBLICATIONS

Zur Muehlen et al., "Developing web services choreography standards—the case of REST vs. SOAP," Decision Support Systems, vol. 40, No. 1, pp. 9-29 (2005).
Arenas et al., "A Direct Mapping of Relational Data to RDF," W3C Recommendation Sep. 27, 2012 (11 pages).
Holzschuher et al., "Performance of Graph Query Languages: Comparison of Cypher, Gremlin and Native Access in Neo4j," Proceedings of the Joint EDBT/ICDT 2013 Workshops, ACM, 2013 (10 pages).
Vinoski, "RESTful Web Services Development Checklist," IEEE Internet Computing 12.6 (2008) (3 pages).
Mora et al., "Engineering optimisations in query rewriting for OBDA," Proceedings of the 9th International Conference on Semantic Systems, 2013, pp. 41-48.
Mora et al., "kyrie2: Query Rewriting under Extensional Constraints in ELHIO," International Semantic Web Conference, 2014, pp. 568-583.
Thakkar et al., "Composing, Optimizing, and Executing Plans for Bioinformatics Web Services," The VLDB Journal, vol. 14, No. 3, pp. 330-353, Sep. 2005.
Richardson et al., "RESTful Web Services," O'Reilly Media, Inc., May 2007 (448 pages).
Akkiraju et al., "Web Service Semantics—WSDL-S," Kno.e.sis Publications, Apr. 2005, available at http://corescholar.libraries.wright.edu/knoesis/69 (44 pages).
Chappell, "Enterprise Service Bus," O'Reilly Media, Inc., 2004, pp. 43-59.
Christensen et al., "Web Services Description Language (WSDL) 1.1," W3C Note Mar. 15, 2001 (27 pages).
Curbera et al., "Unraveling the Web Services Web: An Introduction to SOAP, WSDL, and UDDI," IEEE Internet Computing 6.2 (Mar. 2002), pp. 86-93.
Davis et al., "The Definitive Guide to Linux Network Programming," Apress, 2004, pp. 99-135.
Fitzner et al., "Functional description of geoprocessing services as conjunctive datalog queries," Geoinformatica 15.1 (Oct. 9, 2009), pp. 191-221.
Hofmann, "Syntax and Semantics of Dependent Types," Extensional Constructs in Intensional Type Theory, 1997, pp. 13-54.
Kopecký et al., "hRESTS: an HTML Microformat for Describing RESTful Web Services," Web Intelligence and Intelligent Agent Technology, 2008, WI-IAT'08. IEEE/WIC/ACM International Conference on. vol. 1. IEEE, Dec. 2008, pp. 619-625.
Kopecký, "Web Services Description Language (WSDL) Version 2.0: RDF Mapping," W3C Working Group Note Jun. 26, 2007 (39 pages).
Laskey et al., "Service oriented architecture," Wiley Interdisciplinary Reviews: Computational Statistics 1.1, Jul. 2009, pp. 101-105.
Martin et al., "OWL-S: Semantic Markup for Web Services," W3C Member Submission Nov. 22, 2004 (28 pages).
Newman, "Building Microservices: Designing Fine-Grained Systems," O'Reilly Media, Inc., 2015 (473 pages).
Pedrinaci et al., "Adaptive Service Binding with Lightweight Semantic Web Services," Service Engineering, Springer Vienna, 2011, pp. 233-260.
Perrey et al., "Service-oriented architecture," Proceedings of 2003 Symposium on Applications and the Internet Workshops, IEEE, 2003, pp. 116-119.
Sheth et al., "Semantics Enhanced Services: METEOR-S, SAWSDL and SA-REST," Wright State University, Bulletin of the Technical Committee on Data Engineering 31.3 (Sep. 2008), pp. 8-12.
Thönes, "Microservices," IEEE Software 32.1 (Jan. 2015), pp. 113-116.
Vitvar et al., "WSMO-lite annotations for web services," The Open University, The 5th Annual European Semantic Web Conference (ESWC 2008), Jun. 2008 (17 pages).
Yu et al., "Developing RDF-based Web services for supporting runtime matchmaking and invocation," 7th International Conference on Next Generation Web Services Practices (NWeSP 2011), Oct. 2011 (7 pages).
Abadi et al., "TensorFlow: Large-Scale Machine Learning on Heterogeneous Distributed Systems," arXiv:1603.04467 v2 [cs.DC] (Mar. 16, 2016) (19 pages).
Bahrampour et al., "Comparative Study of Caffe, Neon, Theano, and Torch for Deep Learning," arXiv:1511.06435v2 [cs.LG] (Jan. 4, 2016) (12 pages).
Barber, "This is why the world needs Facebook M: Its new AI and people-powered virtual personal assistant in Messenger app could be better than Apple Siri, Microsoft Cortana and Google Now," CITY A.M., http://www.cityam.com/223196/why-world-needs-facebook-m-its-new-ai-and-people-powered-virtual-personal-assistant-messenger [accessed May 16, 2017] (11 pages).
Bergstra et al., "Theano: Deep Learning on GPUs with Python," Journal of Machine Learning Research 1 (2011) (4 pages).
Bezanson et al., "Julia: A Fast Dynamic Language for Technical Computing," arXiv:1209.5145v1 [cs.PL] (Sep. 24, 2012) (27 pages).
Chen, "Siri, Alexa and Other Virtual Assistants Put to the Test," The New York Times, Jan. 27, 2016, https://www.nytimes.com/2016/01/28/technology/personaltech/siri-alexa-and-other-virtual-assistants-put-to-the-test.html [accessed May 16, 2017] (5 pages).
Morales et al., "SAMOA: Scalable Advanced Massive Online Analysis," Journal of Machine Learning Research 16.1 (2015), pp. 149-153.
Demšar et al., "Orange: Data Mining Toolbox in Python," Journal of Machine Learning Research 14.1 (2013), pp. 2349-2353.
Ghoting et al., "SystemML: Declarative Machine Learning on MapReduce," 2011 IEEE 27th International Conference on Data Engineering (ICDE), Apr. 2011, pp. 231-242.
Jia et al., "Caffe: Convolutional Architecture for Fast Feature Embedding," Proceedings of the 22nd ACM international conference on Multimedia, ACM, 2014, pp. 675-678.
Jones et al., "SciPy: Open Source Scientific Tools for Python," http://www.scipy.org/ [accessed May 4, 2016], archived on Internet Archive Wayback, Aug. 2, 2017, https://web.archive.org/web/20160504064330/http://www.scipy.org (3 pages).
Kamburugamuve et al., "Survey of Distributed Stream Processing for Large Stream Sources," Technical report (2013) (16 pages).
Kelly, "Which is the best digital assistant: Siri, Cortana, Alexa or Google Now?," CNN tech, Jul. 28, 2015, http://money.cnn.com/2015/07/28/technology/digital-assistant-interview/index.html [accessed Apr. 26, 2017] (5 pages).
Köhlbrugge, "An email app Don Draper would use: Turning your messy inbox into a list of actionable items," Medium, Apr. 28, 2014, https://medium.com/@marckohlbrugge/an-email-app-don-draper-would-use-1bccaf2b55b7 [accessed Apr. 26, 2017] (6 pages).
Lunden, "X.ai Lands $2.1M to Build 'Amy', an AI-Powered Personal Assistant for Meetings," TechCrunch, May 21, 2014, https://techcrunch.com/2014/05/21/x-ai-lands-2m-to-build-amy-an-ai-powered-personal-assistant-for-meetings/ [accessed Apr. 26, 2017] (6 pages).
McKinney, "pandas: a Foundational Python Library for Data Analysis and Statistics," Python for High Performance and Scientific Computing (2011), pp. 1-9.
McNeil, "Why Do I Have to Call This App 'Julie'?," The New York Times, Dec. 19, 2015, https://www.nytimes.com/2015/12/20/opinion/sunday/why-do-i-have-to-call-this-app-julie.html [accessed Apr. 26, 2017] (4 pages).
Modha et al., "Cognitive Computing," Communications of the ACM, Aug. 2011, vol. 54, No. 8, pp. 62-71.
McKinney, "Python for Data Analysis: Data wrangling with Pandas, NumPy, and Ipython," O'Reilly Media, Inc., 2012 (470 pages).
Owen et al., "Mahout in Action," Manning Publications Co., 2011 (12 pages).
Pedregosa et al., "Scikit-learn: Machine Learning in Python," Journal of Machine Learning Research 12 (2011), pp. 2825-2830.
Pérez et al., "IPython: A System for Interactive Scientific Computing," Computing in Science & Engineering 9.3 (May 2007) (9 pages).

(56) References Cited

OTHER PUBLICATIONS

Shoro et al., "Big Data Analysis: Ap Spark Perspective," Global Journal of Computer Science and Technology: C Software & Data Engineering, vol. 15, Issue 1, Version 1.0 (2015) (9 pages).
Shukla et al., "Big Data Frameworks: At a Glance," International Journal of Innovations & Advancement in Computer Science IJIACS, vol. 4, Issue 1, Jan. 2015, pp. 169-175.
Summerfield, "Programming in Python 3: A Complete Introduction to the Python Language," Addison-Wesley (2009) (644 pages).
White, "Hadoop: The Definitive Guide," O'Reilly Media, Inc. (2012) (647 pages).
Drumm et al., "QuickMig: Automatic Schema Matching for Data Migration Projects," Proceedings of the Sixteenth ACM Conference on Information and Knowledge Management (CIKM 2007), ACM, 2007, pp. 107-116, cited in Search Report of EP16205543.8.
Doan et al., "Reconciling Schemas of Disparate Data Sources: A Machine-Learning Approach," ACM SIGMOD May 21-24, 2001 ACM, 2001 (12 pages), cited in Search Report of EP16205543.8.
Khan et al., "A Survey of Mobile Cloud Computing Application Models," IEEE Communications Surveys & Tutorials, vol. 16, No. 1, First Quarter 2014, pp. 393-413, cited in Search Report of DE102016220777.6.
European Search Report dated May 10, 2017, issued in European Application No. 16205543.8 (15 pages).
European Search Report dated Jul. 4, 2017, issued in counterpart European Application No. 16204653.6 (10 pages).
German Search Report dated Jul. 17, 2017, issued in German Application No. 102016220777.6 (7 pages, including English abstract).
European Search Report dated Aug. 17, 2017, issued in counterpart European Application No. 16206620.3. (9 pages).
Office action dated May 12, 2020, issued in related JP Application No. 2016-233526, with English Translation. (5 pages).
Non-Final Office Action dated Oct. 2, 2019, issued in U.S. Appl. No. 15/679,406 (56 pages).

\* cited by examiner

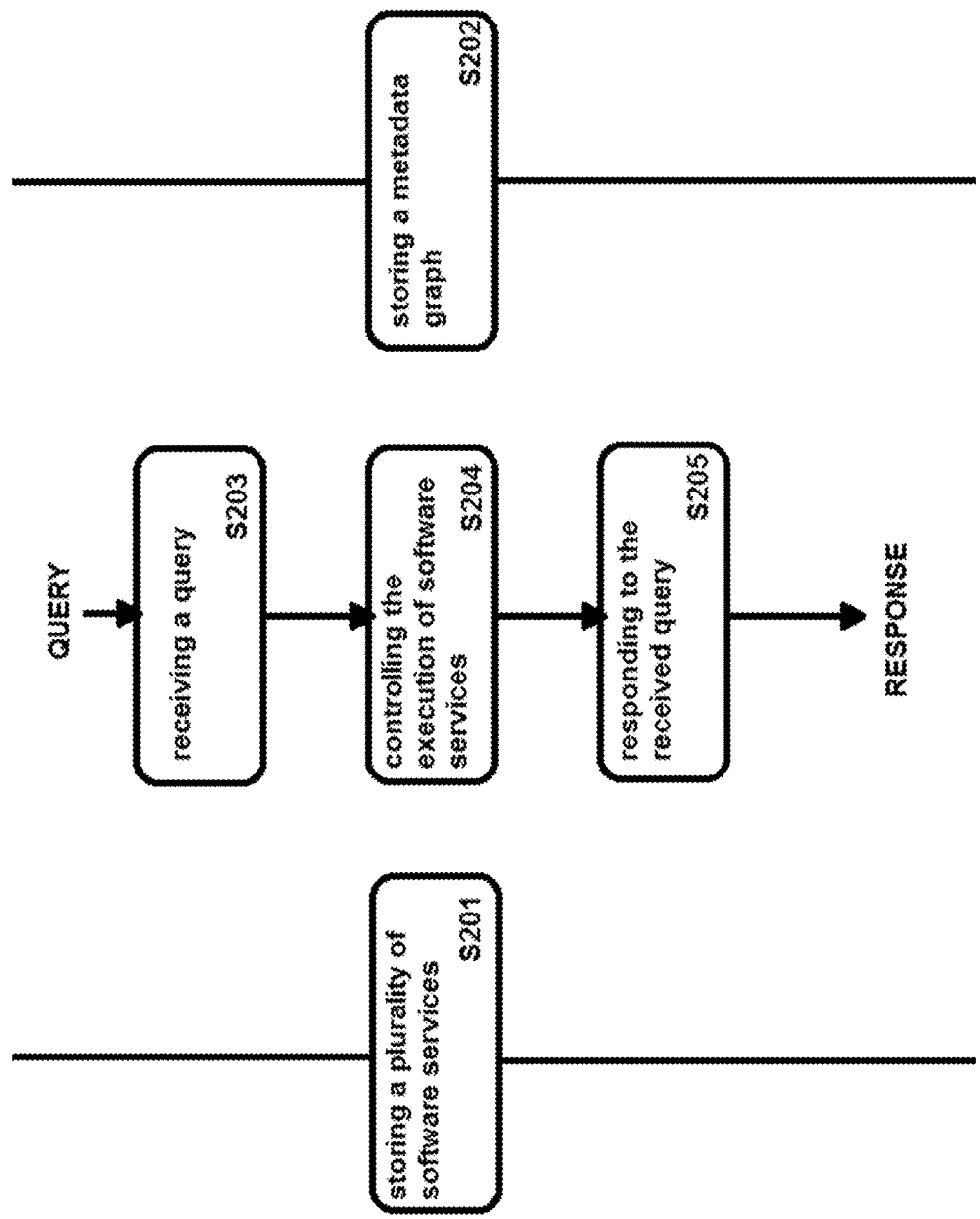

FIGURE 3

| load | | | |
|---|---|---|---|
| | | Show/Hide \| List Operations \| Expand Operations | |
| DELETE | /load/{uri} | | Remove a specific load result for a given ID |
| GET | /load/{uri} | | Get a new load result (a URI) for a given URI (used as ID) |
| POST | /load/{uri} | | Set a new load result for a given ID |
| PUT | /load/{uri} | | Set a new load result for a given ID |

| summarize | | | |
|---|---|---|---|
| | | Show/Hide \| List Operations \| Expand Operations | |
| DELETE | /summarize/{uri} | | Remove a specific summarize result for a given ID |
| GET | /summarize/{uri} | | Get a new summarize result (a URI) for a given URI (used as ID) |
| POST | /summarize/{uri} | | Set a new summarize result for a given ID |
| PUT | /summarize/{uri} | | Set a new summarize result for a given ID |

| transform | | | |
|---|---|---|---|
| | | Show/Hide \| List Operations \| Expand Operations | |
| DELETE | /transform/{uri} | | Remove a specific transform result for a given ID |
| GET | /transform/{uri} | | Get a new transform result (a URI) for a given URI (used as ID) |
| POST | /transform/{uri} | | Set a new transform result for a given ID |
| PUT | /transform/{uri} | | Set a new transform result for a given ID |

PROGRAM, METHOD, AND SYSTEM FOR EXECUTION OF SOFTWARE SERVICES

CROSS-REFERENCE TO RELATED APPLICATION

The present application is based upon and claims the benefit of priority of the prior German patent application no. 102016220779.2 filed Oct. 21, 2016, the entirety of which is herein incorporated by reference.

FIELD

This application lies in the field of data processing architectures and in particular relates to the automatic orchestration of software services, such as web software services.

BACKGROUND

The automatic orchestration and composition of software services, such as web services that are already microservices, is uncommon, and state of the art approaches rely upon heavy annotations of the web services.

Existing techniques seeking to automate the orchestration and composition of web service fall into two broad groups:
1. Those that do not make any decision: all the possibilities to be executed are executed, and the result is equivalent due to set semantics.
2. Those that make decisions based on formal logic, which in most advanced cases have two elements:
   a. Some metadata about the quality of the service that is provided by the service.
   b. An orchestration algorithm that uses such metadata to find a plan adjusting to the quality requested by the user or a set of rules.

The problem is that the orchestration is not autonomous, and the annotations are too heavy. It is difficult to annotate new services, and execution planning is onerous.

SUMMARY

Embodiments include: a software service execution system, comprising: a software library, storing a plurality of software services, each of the plurality of software services being configured, upon execution, to obtain input data from a specified input URI (uniform resource identifier), execute processing on the obtained input data, and output the result of the processing to a specified output URI; a metadata graph representing the plurality of software services, each of the plurality of software services being identifiable in the metadata graph by a predicate defining a relationship between a subject vertex and an object vertex, the subject vertex storing the specified input URI and being linked by a directed edge labelled with the predicate to the object vertex storing the specified output URI; a metadata graph query interface, configured to receive a query, in graph query language, the received query requesting, as a variable, a queried vertex, linked, by a defined traversal path along one or more edges each labelled with a respective specified predicate from among the predicates in the metadata graph, to a source vertex, the value of which is specified by the received query; a software service execution controller, configured to control the execution of the one or more software services identified by the one or more specified predicates labelling edges on the defined traversal path, in an order determined by the defined traversal path. The metadata graph query interface is configured to respond to the received query with a value of the queried vertex, the value being generated by executing the software service identified by the label of the labelled edge linking to the query vertex along the defined traversal path from the source vertex.

Advantageously, embodiments translate queries in graph query language into execution plans for software services. Query languages provide access to the metadata graph, which masks the complexity of the software service architecture from a user/client. The enlisting of the software services in executing data processing tasks is facilitated.

Existing planning algorithms for orchestration of software services are not autonomous, and rely upon heavy (in terms of syntax and logic) annotations. Embodiments of the software service execution system defined and described herein, which, for example, define the semantics of the operation as a predicate, have several advantages:

A high-level graph query language enables a query to request not only results of the terminus of linked microservice processing, of the requested type, but also some intermediate results;

Graph query languages present a client/user with more control about how the results are obtained and how they are related with the original input, and between themselves (in the case of intermediate results).

The integration with other systems is more natural, in the same way as the integration of query languages is more natural than type systems.

Due to the better integration capabilities, better extensibility of the system is enabled, for example through query rewriting.

The software service execution system provides a mechanism to convert a received graph query into execution of software services identified in the graph traversal path defined in the received query. The following of a graph traversal path in response to a received graph query is translated into execution of software services corresponding to the graph traversal path.

The received query is a graph query. Graph query refers to a data query applicable to graph data stores. Examples of languages for graph queries are SPARQL (for triple stores, in RDF) and Cypher (for Neo4j). Graph query languages are advantageous due to their expressiveness and simplicity, as the schema does not need to be specified beforehand (as in regular databases), and can be specified as new data is added to the system. This is particularly advantageous in software service architectures in which ease of addition/removal of software services is desirable.

The traversal path defined by the received query is a traversal path to be followed in generating a response to the query. The metadata graph query interface is configured to translate the received query into one or more traversal paths. Each traversal path may be handled independently by the metadata graph query interface and software service execution controller, noting that traversal paths overlapping one another may share output results, so that software services appearing on two defined traversal paths with the same input data need not be executed more than once.

Each of the plurality of software services is identifiable in the metadata graph by a predicate defining a relationship between a subject vertex and an object vertex. Being identifiable is taken mean distinguishable from among the plurality of software services. For example, the predicate may be a URI or URL (uniform resource locator) that links to the software service. The predicate (and the URI or URL of the software service) may be, or may include, a semantic descriptor of the data processing performed by the software service when executed.

Optionally, the value of the source vertex is specified by an expressly-defined value or by a URI (uniform resource identifier) or URL (uniform resource locator) of a location from which data for processing by the software service identified by the labelled edge linking to the source vertex along the defined traversal path to the query vertex.

The source vertex effectively defines a known starting point, whether it be a single value, or data stored in a defined file or database, for the received query. The traversal path defined by the query is a route, along a series of the labelled edges of the metadata graph, from the source vertex to one or more queried vertices. The software service execution controller is configured to access the value or data defined by the source vertex, and provide said value or data to the software service identified by the labelled edge linking to the source vertex along the defined traversal path to the query vertex.

It may be that the value of the queried vertex output in response to the received query is either the specified output URI of, or the result of the processing of, the software service identified by the label of the labelled edge linking to the queried vertex along the defined traversal path from the source vertex.

The specified output URI may be, for example, a URL. The purpose of a query is to obtain a value for an unknown. In the context of the software service execution system, the unknown is the queried vertex, which is identified in the received graph query, and extracted by the metadata graph query interface. A traversal path followed by the software service execution controller is a series of processing tasks (executions of software services) to obtain a value of the queried vertex, given particular boundary conditions (i.e. the source vertex and one or more specified predicates). The value of the queried vertex is obtained by the software service execution controller controlling execution of the software services in accordance with the traversal path. The identity of the software service, identified by the label of the labelled edge linking to the queried vertex along the defined traversal path, determines the nature of the processing result. The type may be constrained to being a URI or URL, however, the data stored at the URI or URL specified by the software service is not constrained, and may be, for example, a single data value, a vector of data values, an image, a database, or some other form of data obtained by executing the processing of the software service.

Optionally, the software execution controller is configured to control the execution of the one or more software services identified by the one or more specified predicates labelling edges on the defined traversal path by, for the or each vertex between the source vertex and the queried vertex on the defined traversal path, providing the result of the processing of the software service identified by the labelled edge on a source-vertex-side of the respective vertex as input data to the software service on a queried-vertex-side of the respective vertex.

In other words, should the traversal path include one or more "intermediate vertices", that is to say, vertices that are neither the source vertex nor the query vertex, then the vertex indicates sharing of data between the two software services identified by the labelled edges on either side of the intermediate vertex on the traversal path. Sharing of data meaning the processing result of the preceding software service (i.e. identified by the predicate of the source-vertex-side edge) being provided as input data to the proceeding software service (i.e. identified by the predicate of the queried-vertex-side edge).

The software services may be web services. Whether web services or otherwise, it may be that the software services are microservices.

A microservice is an atomic service in a data processing apparatus. Atomic in this context means single responsibility or single function. A microservice is distinguished from a generic web service by the dimension of service. For example, a generic web service would include some form of authentication as part of a wider functionality. In a microservice-based apparatus, authentication is a dedicated microservice.

As a particular example of software services, the software services are RESTful software services, each defining methods for GET, and POST and/or PUT requests.

REST (Representational State Transfer) is an architectural style which governs the proper behaviour of participants in the web for machines. REST sets out constraints for system architectures to which conforming is described as being RESTfur, the first of which is that the architecture has a client-server arrangement, with clients being separated from servers by a uniform interface. There are four guiding principles of the interface between client and server, and an interface developed in accordance with these principles can be described as RESTfur. For example, an API can be written in accordance with the REST guiding principles for interfaces to the software services, and would hence be described as a 'RESTful API'. HTTP as a protocol can be used in a RESTful manner, and RESTful HTTP is suitable for the web for machines. RESTful interfaces (APIs) are popular for a number of key reasons: there is simplicity of the basic protocol built on a proven foundation with solid architectural principles, and the result is approachable and usable by web developers.

In brief, the REST architectural style describes six constraints (one of the six is optional) on a system architecture are as follows:

the architecture should be client-server;
the client and server are separated by a uniform interface;
the architecture is stateless, meaning that no client context is stored on the server between requests from the client—each request contains all of the information necessary to service the request, with state information held in the client itself;
clients are able to cache responses;
(optional) functionality may be extended by a server transferring logic to a client which the client can execute.

In the context of the software service execution system, the client is the metadata graph query interface, and the server is the web server or other computing device executing the software services.

The guiding principles for the uniform interface are briefly summarised below:

individual resources in the domain can be identified in requests from the client (this would be via URIs (Universal Resource Identifiers) in a web-based system). The resources themselves are separate entities from the representations returned to the client;
the representation of a resource held by a client is sufficient to give the client enough information to modify or delete the resource on the server (permissions allowing);
each message between client and server contains enough information for the recipient to process the message;
the representation of a resource provided from the server to the client should include hypertext links to related resources.

A positive aspect of the REST architectural style is that it links well with information models, an information model being a formalised description of items in a domain and relationships between those items. The operations allowed in a RESTful API are constrained (fixed), this avoids the unwanted side effects of poor programming behaviour which would ordinarily lead to problems in linking an interface with an information model.

In fact, a RESTful API for a particular domain may be defined purely in terms of the information model for the domain, and by how this model then appears inside different data formats, the data formats being wire level (low level or implementation level) manifestations of the information model. Unfortunately, APIs currently in use show disparities regarding their approach to information modelling, how this appears inside data formats, and how the semantics of HTTP are brought to use in the specific domain of the API(s) in question. This lack of consistency is problematic since potential benefits of a RESTful protocols are lost, for example, the potential for re-usable toolkits (eg standard code) and generic client agents (equivalent to a browser).

The four listed defined methods are exemplary of the content of a RESTful interface (API) for a software service.

In embodiments in which the software services are RESTful, it may be that the software service execution controller is configured to control the execution of the one or more software services identified by the one or more specified predicates labelling edges on the defined traversal path by: when, following the defined traversal path from source vertex to query vertex, the edge labelled with the specified predicate identifying the respective software service is traversed from a subject vertex of the specified predicate to an object vertex of the specified predicate, issuing a GET request to the software service.

The GET request, which may, for example, be specified by the API of the respective software service, is a RESTful execution method for the software service. The software service execution controller follows the traversal path extracted by the metadata graph query interface, issuing GET requests to software services identified by labelled edges on input data defined either by the source vertex or by the processing result of the preceding software service on the traversal path.

Optionally, the predicate by which a software service is identifiable in the metadata graph is a URI (uniform resource identifier) or URL (uniform resource locator) of the software service.

The predicate with which the directed edge linking the input and output in the metadata graph is labelled is a semantic descriptor of the processing executed by the respective software service. Advantageously, the semantics in such embodiments are lightweight, and they can be specified in the URL of the service, without requiring any additional annotations.

In existing software service execution systems, a registry is necessary to keep the information about the available software services. The matching of predicates to software service URLs obviates the need for such a registry. The predicates used in the query are directly mapped to the URLs of the software services. Therefore, the relevant information is provided in the query and does not need to be registered otherwise.

In a particular implementation of the software service execution controller, the software service execution controller comprises a knowledge base, the software service execution controller being configured to add a record to the knowledge base for each traversal path, recording the traversal path, the queried vertex or vertices, and the source vertex, and the software services executed by the software service execution controller in obtaining a result of the queried vertex or vertices; the software service execution controller being configured to compare a defined traversal path with traversal paths recorded in the knowledge base in order to optimise the control of executing software services in generating a response to the defined traversal path.

Advantageously, such a knowledge base enables the software execution control to learn from previous execution plans in order to optimise selection and execution of software services.

Embodiments of another aspect include a software service execution method, comprising: storing a plurality of software services, each software service being configured, upon execution, to obtain input data from a specified input URI, execute processing on the obtained input data, and output the result of the processing to a specified output URI; storing a metadata graph representing the plurality of software services, each software service being identifiable in the metadata graph by a predicate defining a relationship between a subject vertex and an object vertex, the subject vertex storing the specified input URI and being linked by a directed edge labelled with the predicate to the object vertex storing the specified output URI; receiving a query, in graph query language, the received query requesting, as a variable, a queried vertex, linked, by a defined traversal path along one or more edges each labelled with a respective specified predicate from among the predicates in the metadata graph, to a source vertex, the value of which is specified by the received query; controlling the execution of the one or more stored software services identified by the one or more specified predicates labelling edges on the defined traversal path, in an order determined by the defined traversal path; responding to the received query with a value of the queried vertex, the value being generated by executing the software service identified by the label of the labelled edge linking to the queried vertex along the defined traversal path from the source vertex.

Embodiments of another aspect include a computer program which, when executed by a computing apparatus, causes the computing apparatus to function as a system defined in the claims as an invention embodiment.

Embodiments of another aspect include a computer program which, when executed by a computing apparatus, causes the computing apparatus to perform a method defined above or elsewhere in this document as an invention embodiment.

Furthermore, embodiments of the present invention include a computer program or suite of computer programs, which, when executed by a plurality of interconnected computing devices, cause the plurality of interconnected computing devices to operate as a system embodying the present invention.

In any of the above aspects, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

BRIEF DESCRIPTION OF THE DRAWINGS

Preferred features of the present invention will now be described, purely by way of example, with reference to the accompanying drawings, in which:—

FIG. 2 illustrates a software service execution method;

FIG. 3 illustrates a representation of exemplary software services; and

DETAILED DESCRIPTION

Figure 1:
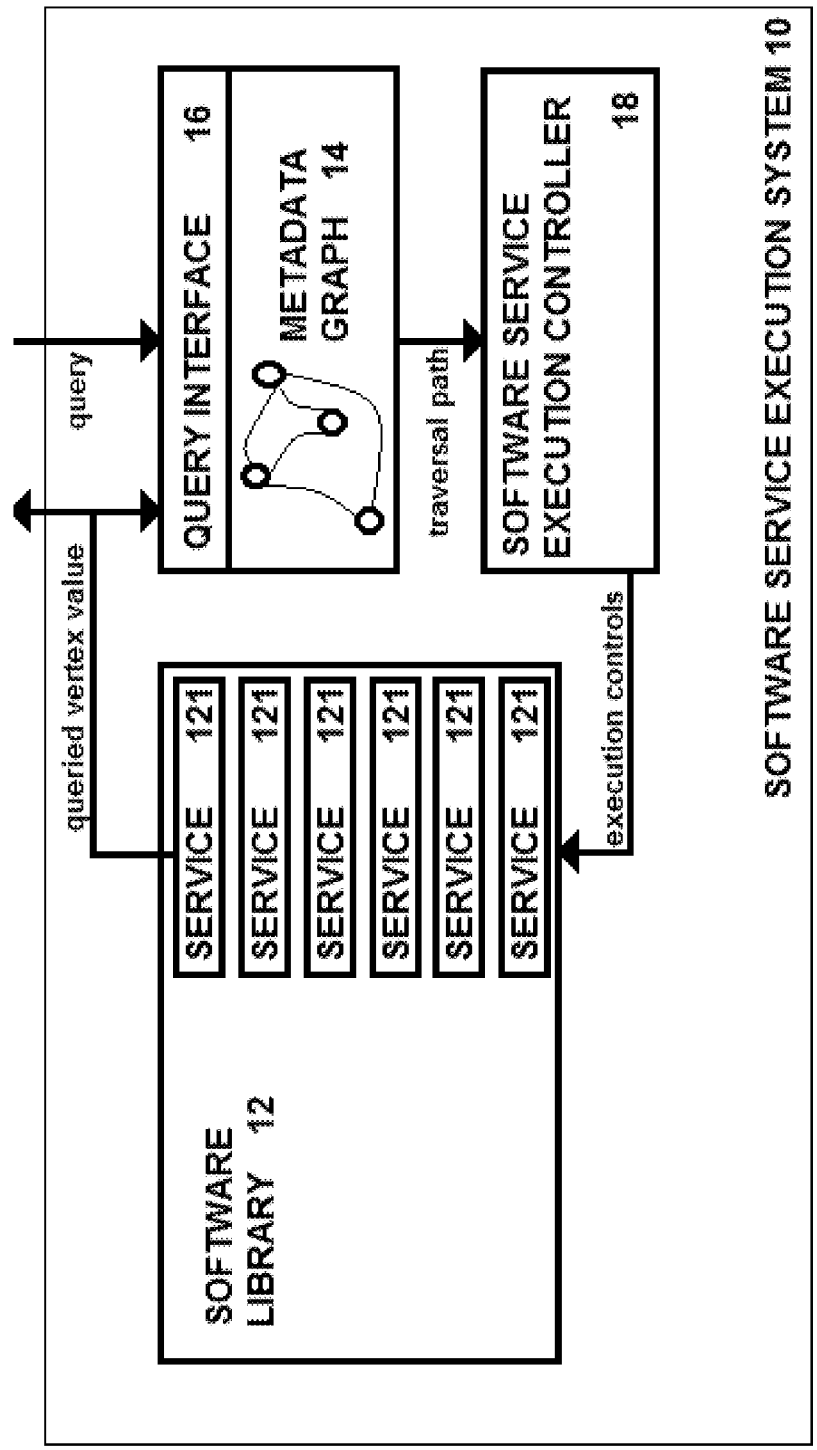
FIG. 1 illustrates a software service execution system.

FIG. 1 illustrates a software service execution system 10. The system 10 comprises a software library 12, a plurality of software services 121, a metadata graph 14, a metadata graph query interface 16, and a software service execution controller 18. The software service execution system 10 may be, for example, a web server or plural of interconnected web servers.

FIG. 2 illustrates a software service execution method.

The software library 12 is configured to store a plurality of software services 121, each software service 121 being configured, upon execution, to obtain input data from a specified input URI, execute processing on the obtained input data, and output the result of the processing to a specified output URI.

The storage of the plurality of software services, each software service being configured, upon execution, to obtain input data from a specified input URI, execute processing on the obtained input data, and output the result of the processing to a specified output URI, is represented by step S201 in FIG. 2. The line intersecting step S201 indicating the storage persists during performance of steps S203 to S205. The storage of software services in step S201 may be performed by the software library 12 of FIG. 1.

The software library 12 stores the software services 121 as executable software. The software services 121 may be web services. The web services may be microservices. The plurality of software services 121 may be stored on a single server, such as a web server, or may be distributed over a network of interconnected web servers. The specified input URI may be, for example, a URL. The specified output URI may be, for example, a URL.

The software service 121 may be a processor (CPU) for executing processing logic, and a memory for storing the processing logic, and for storing data being processed.

The software library 12 may also store, for example, interfaces such as APIs, which define how the processing function of the respective software service can be triggered, how to specify inputs, and where to access processing results. The software library 12 may also comprise a processor and other hardware required to execute the software services 121. For example, the software services 121 may be web services and the software library 12 a web server.

An API is an Application programming interface. An interface that allows some software element to be used from a different software element (programs, libraries, etc.).

The metadata graph 14 is a model (representation) of the plurality of software services 121 stored by the software library 12. The predicate by which each of the software services is identifiable may be a semantic descriptor of the processing executed by the respective software service. Edges in the metadata graph 14 are directed, reflecting that there is a default process performed by each software service, to transform input data into an output result. The direction of the directed edge connecting two vertices determines which is the subject vertex and which the object vertex.

A step of storing the metadata graph representing the plurality of software services, each software service being identifiable in the metadata graph by a predicate defining a relationship between a subject vertex and an object vertex, the subject vertex storing the specified input URI and being linked by a directed edge labelled with the predicate to the object vertex storing the specified output URI, is represented by step S202 in FIG. 2. The line intersecting step S202 indicates that the storage persists during performance of steps S203 to S205. The metadata graph stored in step S202 may be the metadata graph 14 of FIG. 1.

The metadata graph 14 may be encoded, for example, as triples, such as RDF triples. Each triple comprises a value for each of three data elements: subject, predicate, and object. The values of the respective data elements may store the entire vertex (or label in the case of predicate), or may store an identifier to a storage location from which said entire vertex (or label in the case of a predicate) is accessible.

The metadata graph 14 may be stored by a single computing device, such as a server, or by plural computing devices cooperating with one another. The metadata graph 14 may be stored by the same server on which the software library 12 is stored and executable.

A representation of the metadata graph 14 may be made public or otherwise available to clients/users of the software service execution system 10.

The metadata graph 14 is accessible to clients/users via the metadata graph query interface 16. As illustrated in FIG. 1, queries are received by the interface 16.

The receiving of a query, in graph query language, the received query requesting, as a variable, a queried vertex, linked, by a defined traversal path along one or more edges each labelled with a respective specified predicate from among the predicates in the metadata graph, to a source vertex, the value of which is specified by the received query; is illustrated by step S203 in FIG. 2. The receiving of a query in step S203 may be performed, for example, by the metadata graph query interface 16 of FIG. 1.

The metadata graph query interface 16 provides a mechanism for clients/users to access the data processing capabilities of the plurality of software services, via the flow of processing highlighted by the labelled arrows in FIG. 1, which are discussed in more detail herein. The metadata graph query interface 16 receives a query from a client/user, represented by the "query" arrow in FIG. 1. The received query is in a graph query language, for example, SPARQL or Cypher. The metadata graph query interface 16 parses the received query and extracts: a traversal path defined by the received query; one or more queried vertices identified as declared variables in the received query and requested in response to the query (for example, by a SELECT clause); a source vertex (these extracted elements can be summarised as "traversal path", since the source vertex and queried vertex/vertices are constituent elements of the traversal path). The source vertex effectively defines a known starting point, whether it be a single value, or data stored in a defined file or database, for the received query. A defined traversal path is a plurality of interconnected vertices in the metadata graph, wherein interconnected denotes linked via edges in the metadata graph. A traversal path is defined by a graph query, since a traversal path sets a path across the graph that must be followed to answer the query. Complex queries may define plural traversal paths. The software service execution system 10 is configured to compile the complex query into a series of traversal paths, and to handle each of the series of traversal paths at the software service execution controller and metadata graph query interface in the manner defined for one traversal path.

Optionally, the metadata graph query interface 16 is configured to receive metadata graph queries in domain specific language and translate the domain specific language into graph query language.

The metadata graph query interface 16 outputs the extracted traversal path, defined by the received query, to the software service execution controller, as indicated by the "traversal path" arrow in FIG. 1.

A step of controlling the execution of the one or more stored software services identified by the one or more specified predicates labelling edges on the defined traversal path, in an order determined by the defined traversal path; is illustrated by step S204 in FIG. 2. The controlling of the execution of software services S204 may be performed, for example, by the software service execution controller 18 of FIG. 1.

The software service execution controller 18 interacts with the software library, controlling execution of software services 121 and setting any required runtime parameters (for example, identifying input data). The software service execution controller 18 is configured to control the execution of the one or more software services 121 identified by the one or more specified predicates labelling edges on the defined traversal path, in an order determined by the defined traversal path. The software service execution controller 18 controls relative timing of the software services 121, and links the output result of one software service 121 to the input of another, in accordance with the traversal path being followed. The control of execution of software services 121 by the software service execution controller 18 is illustrated by the "execution controls" arrow in FIG. 1.

A step of responding to the received query with a value of the queried vertex, the value being generated by executing the software service identified by the label of the labelled edge linking to the queried vertex along the defined traversal path from the source vertex; is illustrated by step S205 in FIG. 2. The responding to the received query S205 may be performed, for example, by the metadata graph interface 16 of FIG. 1.

One or more of the vertices on the traversal path are requested by the received graph query, for ease of reference, these one or more vertices are referred to as queried vertices. The metadata graph query interface 16 is configured to respond to the received query by outputting (either explicitly or by outputting a reference to a location from which the result is accessible) the result of the processing of the software service 121 identified by the predicate preceding the respective queried vertex on the traversal path. The software service execution controller 18 controls output of vertex values (i.e. processing results) by the software services 121. The output of values of queried vertices from the software services 121 to the query interface 16, and then to a user/client, is indicated by the "queried vertex value" arrow in FIG. 1.

FIG. 3 illustrates exemplary APIs by which software services 121 in a software library 12 are executable. In the example of FIG. 3, the software services 121 are microservices.

Each of the microservices maps to a predicate in graph query language (the mapping may be implicit, by the URL of the microservice.

Each one of the microservices accepts and produces uniquely one value, for example, a URI or URL that is mapped to a document, such as JSON, RDF, JSON-LD, etc., and stored somewhere else (filesystem, Redis, MongoDB, or any document/file store).

Each microservice corresponds to an edge of the metadata graph 14, their respective input and outputs being vertices of the metadata graph 14. The annotation above the respective APIs "load", "summarize", "transform", are semantic descriptors of the processing performed by the microservices when executed, and are the predicates with which the respective edges are labelled in the metadata graph 14.

A received query in graph query language (e.g. SPARQL, Cypher, etc.) allows the retrieval of inputs and/or outputs (processing results) of microservices by specifying vertices corresponding to requested processing results as variables in the graph query. For example, by using declared variables.

The software service execution system 10 accepts the query in graph query language via the metadata graph query interface 16, and the software service execution controller 18 calls the microservices identified by predicates in the graph query language with the values (i.e. input data) specified in the graph query language and obtained from other microservices, and returns the values corresponding to the variables in the query, via the metadata graph query interface 16.

In the microservice embodiment of FIG. 3, the URLs for the microservices are directly obtainable from the predicates in the query. That is to say, the predicates in the metadata graph are microservice URLs.

In the microservice architecture exemplified by FIG. 3, each microservice has the following features:

Each microservice specifies only a single input variable and a single output variable.

The specified input variable and the specified output variable are of type URL.

Optionally, the URL of the microservice defines a semantic relation between the input and the output.

Each microservice defines REST methods GET, PUT, POST and DELETE for relations between the corresponding input and output values. The REST methods, when called, trigger the following processing:

GET obtains the output from the input. In embodiments, the processing result will be persisted, cached, memorized, or a combination of the previous, and may be made available to other microservices.

PUT and POST allow setting the processing result that must be returned for a particular input. In some embodiments, machine learning algorithms are triggered in response to PUT and POST in order to re-configure the microservice.

DELETE allows deleting a processing result from the persistence layer or cache, if being used in the particular implementation (that is to say, in some implementations there may be no microservice DELETE option, depending on if/where/how the processing results of the microservice are stored).

The microservices of FIG. 3 exemplify a software library 12 in an embodiment. The remaining features of FIG. 1 interact with the microservices of FIG. 3 in the same way as described with relation to the software library 12 and software services 121 in the description of FIG. 1.

Microservices are abstracted to higher software layers (clients/users of the software service execution system 10), which only need to consider the metadata graph query interface 16 with the graph query language. Transparently to those layers, the microservices are called and executed by the software service execution controller 18, which implies side effects in some cases or complex calculations in others. The values corresponding to the URLs that are used as parameters in the microservices (and as vertexes in the graph) are accessible through their corresponding URLs, which means:

They are accessible for microservices to be used in their operations, when they run.

They are accessible for the representation of the final response of the system.

The graph that is used by the system, with URLs in the vertexes and predicates (corresponding to microservices) in the edges is a metadata graph, with the data being accessible through the URLs in the edges and the processes to calculate data at the vertices being accessible as microservices corresponding to the URLs of the edges.

FIG. 3 illustrates a high-level description of the algorithms (microservices) in the software library 12. The illustrated microservices are mapped to a metadata graph as edges, with the labels of the respective edges corresponding to the titles of the microservices in FIG. 3: "load"; "summarize"; "transform". Optionally, the logging and the use of a knowledge base is used for the optimisation of the query execution plans, generated from the queries. The optimisation allows avoiding redundant answers and performing some operations in a different order, when the answers are equally correct (sound and complete), and the execution is more efficient, for example by choosing one microservice among several options that perform the same operation. In the example of FIG. 3, documentation for microservices implementing operations for analysis of documents, specifically the operations load, transform and summarize. FIG. 3 shows the documentation of these services as generated by OpenAPI.

A query is received by the metadata graph query interface 16 in SPARQL query language, as follows:

```
SELECT ?summary WHERE {
    <http://fle.fujitsu.com/resources/example.csv> :load ?loadedResource
    .
    ?loadedResource :transform ?processedResource .
    ?processedResource :summarize ?summary .
}
```

The traversal path defined by such a query is:
Source vertex (URL: http://example.com/resources/example.csv)-predicate (load)-intermediate vertex (variable: ?loadedResource)-predicate (transform)-intermediate vertex (variable: ?processedResource)-predicate (summarize)-queried vertex (variable: ?summary)

The software service execution controller 18 controls execution of the microservices as follows in response to the defined traversal path:
1. The file at a remote URL, in this case <http://fle.fujitsu.com/resources/example.csv>, is loaded, and becomes a loaded (local) resource.
2. As a local resource, it can be transformed, for example a CSV file can be parsed into a matrix (in general terms), or a dataframe (in this worked example). Therefore, processedResource is a URL that now points to the location of such dataframe.
3. The predicate:summarize corresponds to the microservice that can use the dataframe of the previous step to produce a summary. The summary result (as a URL) is the value for the variable ?summary, which is returned in response to the received query, as it is a distinguished variable of the query (i.e. it is in the SELECT clause).

In this way, the user obtains a URL pointing to the requested summary. If the user is some software, it can access the contents of the URL and use them for any purpose, for example showing them in some GUI to a human user. The operations are defined, declaratively, at a high-level, as part of a query language. As a consequence, there are several advantages and optimisations that can be performed and enabled by the system automatically. For example, if the resource at the URL <http://fle.fujitsu.com/resources/example.csv> had already been loaded recently (or not recently, but persisted for some reason) then such a remote access would not be performed again, the URL for ?loadedResource would have been obtained in a previous operation and would be returned again, without accessing to the remote resource again and without incurring in the time (and potential economic costs) that such an operation implies.

Figure 4:
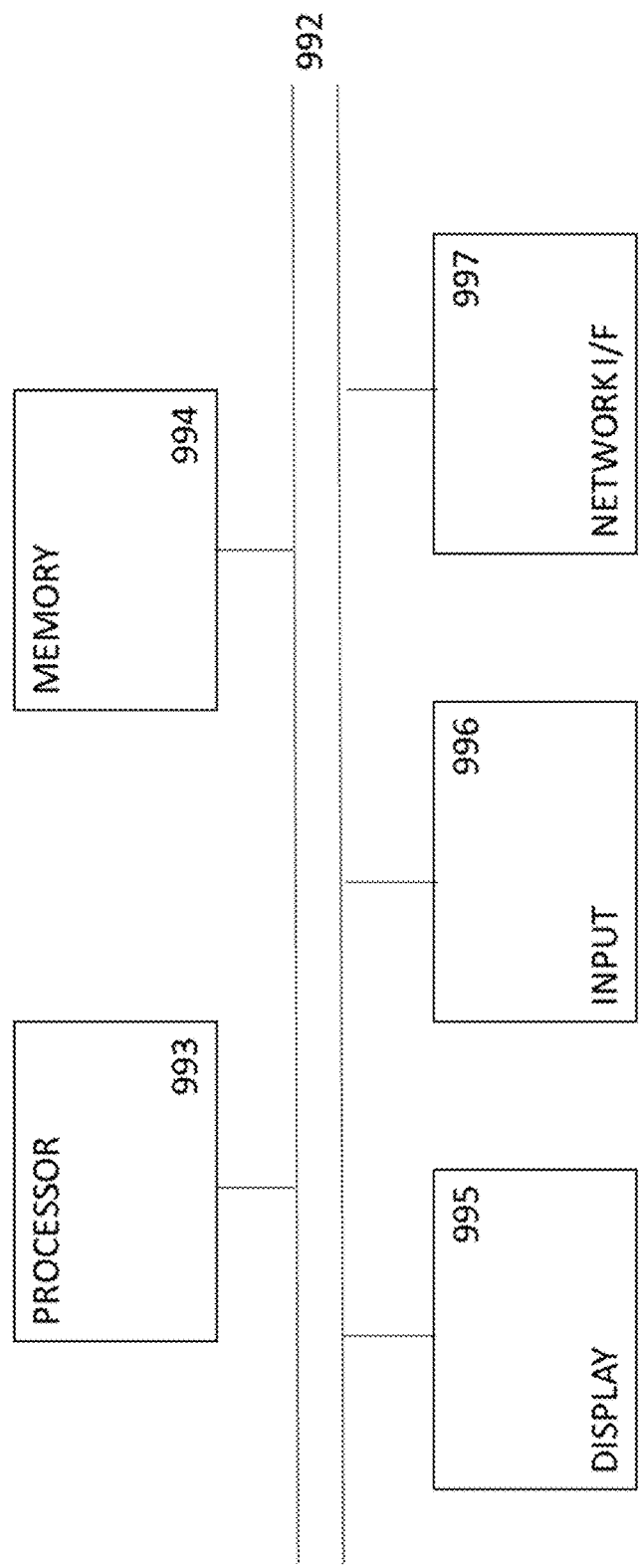
FIG. 4 illustrates a hardware configuration of an embodiment.

FIG. 4 is a block diagram of a computing device, such as a web server, which embodies the present invention, and which may be used to implement a method of an embodiment of the software service execution method. The computing device comprises a processor 993, and memory, 994. Optionally, the computing device also includes a network interface 997 for communication with other computing devices, for example with other computing devices of invention embodiments.

For example, an embodiment may be composed of a network of such computing devices. Optionally, the computing device also includes one or more input mechanisms such as keyboard and mouse 996, and a display unit such as one or more monitors 995. The components are connectable to one another via a bus 992.

The memory 994 may include a computer readable medium, which term may refer to a single medium or multiple media (e.g., a centralized or distributed database and/or associated caches and servers) configured to carry computer-executable instructions or have data structures stored thereon. Computer-executable instructions may include, for example, instructions and data accessible by and causing a general purpose computer, special purpose computer, or special purpose processing device (e.g., one or more processors) to perform one or more functions or operations. Thus, the term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor 993 is configured to control the computing device and execute processing operations, for example executing code stored in the memory to implement the various different functions of the components of the software service execution system described here and in the claims. The memory 994 stores data being read and written by the processor 993. As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and steps discussed herein.

The display unit 997 may display a representation of data stored by the computing device and may also display a cursor and dialog boxes and screens enabling interaction between a user and the programs and data stored on the computing device. The input mechanisms 996 may enable a user to input data and instructions to the computing device.

The network interface (network I/F) 997 may be connected to a network, such as the Internet, and is connectable to other such computing devices via the network. The network I/F 997 may control data input/output from/to other apparatus via the network. Other peripheral devices such as microphone, speakers, printer, power supply unit, fan, case, scanner, trackerball etc may be included in the computing device.

The software library 12 of FIG. 1 and the storing a plurality of software services step S201 of FIG. 2 may be a memory 994 storing software services 121, and optionally also a processor 993 (or plurality thereof) executing processing instructions (a program) of the software services 121 and exchanging data via a network I/F 997 to access input data and post processing results. In particular, the processor 993 executes processing instructions to receive, via the network I/F, input data from the URL specified for input data by a particular software service and execute the processing of the software service 121 to generate a processing result. Furthermore, the processor 993 may execute processing instructions to store the processing result on a connected storage unit, for example in a JSON, RDF, JSON-LD document etc and/or to transmit, via the network I/F 997, the processing result to the metadata graph query interface for output to a client/user. The execution of software services by the software library 12 is under the control of the software service execution controller 18.

The metadata graph 14 of FIG. 1 and the storing a metadata graph S202 of FIG. 2, and associated metadata graph query interface 16 of FIG. 1 and receiving S203 and responding to a query S205 of FIG. 2 may be a memory 994 storing the metadata graph 14 and a processor 993 (or plurality thereof) executing processing instructions (a program) stored on a memory 994 and exchanging data via a network I/F 997 to handle received queries and extract defined traversal paths. In particular, the processor 993 executes processing instructions to receive, via the network I/F, a query to the metadata graph 14 from a client/user (e.g. a higher-level software entity) and extract a defined traversal path from the received query. Furthermore, the processor 993 may execute processing instructions to store the extracted traversal path on a connected storage unit and/or to transmit, via the network I/F 997, the extracted traversal path to the software service execution controller for processing.

The software service execution controller 18 of FIG. 1 and the controlling the execution of software services S204 of FIG. 2 may be a processor 993 (or plurality thereof) executing processing instructions (a program) stored on a memory 994 and exchanging data via a network I/F 997. In particular, the processor 993 executes processing instructions to receive, via the network I/F, a traversal path defined in the received query and extracted by the metadata graph query interface 16 from the metadata graph query interface 16 and translate the received traversal path into a set of calls (e.g. calls to REST methods) or other execution instructions to the software library 12 for executing the software services 121 identified by predicates on the traversal path. Furthermore, the processor 993 may execute processing instructions to store a record of the traversal path and the execution control on a connected storage unit (knowledge base).

Methods embodying the present invention may be carried out on a computing device such as that illustrated in FIG. 4. Such a computing device need not have every component illustrated in FIG. 4, and may be composed of a subset of those components. A method embodying the present invention may be carried out by a single computing device in communication with one or more data storage servers via a network. The computing device may be a data storage itself storing the processing result corresponding to the queried vertex in the received query.

A method embodying the present invention may be carried out by a plurality of computing devices operating in cooperation with one another. One or more of the plurality of computing devices may be a data storage server storing at least a portion of the metadata graph and/or the processing results of software services 121 in the software library 12.

The invention claimed is:

1. A software service execution system, comprising:
a memory; and
a processor connected to the memory,
wherein the memory stores:
  a software library, including a plurality of software services, each software service being configured, upon execution, to obtain input data from a specified input uniform resource identifier (URI), execute processing on the obtained input data, and output a result of the processing to a specified output URI; and
  a metadata graph representing the plurality of software services, each software service being identifiable in the metadata graph by a labelled edge between a subject vertex and an object vertex, the subject vertex storing the specified input URI and being linked by the labelled edge directed to the object vertex storing the specified output URI, the labelled edge being labelled with a URI of the software service, and
wherein the processor is configured to:
  receive a query, in graph query language, the received query requesting, as a variable, a queried vertex, linked, by a defined traversal path along one or more labelled edges each labelled with a URI of a respective software service, to a source vertex, a value of the source vertex is specified by the received query;
  control execution of one or more software services respectively identified by the one or more labelled edges on the defined traversal path by, for each vertex between the source vertex and the queried vertex on the defined traversal path, providing a result of the execution of a software se rvice identified by the labelled edge on a source-vertex-side of the respective vertex as input data to a software service on a queried-vertex-side of the respective vertex; and respond to the received query with a value of the queried vertex, the value being a result of the controlled execution of the one or more software services respectively identified by the one or more labelled edges on edge the defined traversal path from the source vertex.

2. A software execution system according to claim 1, wherein the value of the source vertex is specified by an expressly-defined value or by a URI of a location from which data for processing by a software service identified by the one or more labelled edges linking to the source vertex along the defined traversal path to the query vertex.

3. A software execution service according to claim 1, wherein the value of the queried vertex output in response to the received query is either the specified output URI of, or the result of the processing of, the software service identified by the label of the one or more labelled edges linking to the query vertex along the defined traversal path from the source vertex.

4. A software execution system according to claim 1, wherein the software services are microservices.

5. A software execution system according to claim 1, wherein the software services are RESTful software services, each defining methods for GET, and POST and/or PUT requests.

6. A software execution system according to claim 5, wherein the processor is further configured to control the execution of the one or more software services respectively identified by the one or more labelled edges on the defined traversal path by issuing a GET request to the software service when, following the defined traversal path from source vertex to query vertex, the labelled edge identifying the respective software service is traversed from the subject vertex of the labelled edge to an object vertex of the labelled edge.

7. A software service execution system according to claim 1, wherein the labelled edge is a semantic descriptor of the processing executed by the respective software service.

8. A software service execution system according to claim 1, wherein the the memory further stores a knowledge base, and wherein the processor is further configured to:
add a record to the knowledge base for each traversal path, recording the traversal path, the queried vertex or vertices, and the source vertex, and the software services executed by the software service execution controller in obtaining a result of the queried vertex or vertices; and
compare a defined traversal path with traversal paths recorded in the knowledge base in order to optimise the control of executing software services in generating a response to the defined traversal path.

9. A software service execution method, comprising:
storing a plurality of software services, each software service being configured, upon execution, to obtain input data from a specified input uniform resource identifier (URI), execute processing on the obtained input data, and output a result of the processing to a specified output URI;
storing a metadata graph representing the plurality of software services, each software service being identifiable in the metadata graph by a labelled edge between a subject vertex and an object vertex, the subject vertex storing the specified input URI and being linked by the labelled edge directed to the object vertex storing the specified output URI, the labelled edge being labelled with a URI of the software service;
receiving a query, in graph query language, the received query requesting, as a variable, a queried vertex, linked, by a defined traversal path along one or more labelled edges each labelled with a URI of a respective software service, to a source vertex, a value of the source vertex is specified by the received query;
controlling execution of one or more stored software services respectively identified by the one or more labelled edges on the defined traversal path, in an order determined by the defined traversal path by, for each vertex between the source vertex and the queried vertex on the defined traversal path, providing a result of the execution of a software service identified by the labelled edge on a source-vertex-side of the respective vertex as input data to a software service on a queried-vertex-side of the respective vertex; and
responding to the received query with a value of the queried vertex, the value being a result of the controlled execution of the one or more software services respectively identified by the one or more labelled edges on the defined traversal path from the source vertex.

10. A non-transitory computer-readable medium storing a computer program which, when executed by a computing device, causes the computing device to execute a method comprising:
storing a plurality of software services, each software service being configured, upon execution, to obtain input data from a specified input uniform resource identifier (URI), execute processing on the obtained input data, and output a result of the processing to a specified output URI;
storing a metadata graph representing the plurality of software services, each software service being identifiable in the metadata graph by a labelled edge between a subject vertex and an object vertex, the subject vertex storing the specified input URI and being linked by the labelled edge directed to the object vertex storing the specified output URI, the labelled edge being labelled with a URI o the software service;
receiving a query, in graph query language, the received query requesting, as a variable, a queried vertex, linked, by a defined traversal path along one or more labelled edges each labelled with a URI of a respective software service to a source vertex, a value of the source vertex is specified by the received query;
controlling execution of one or more stored software services respectively identified by one or more labelled edges on the defined traversal path, in an order determined by the defined traversal path by, for each vertex between the source vertex and the queried vertex on the defined traversal path, providing a result of the execution of a software service identified by the labelled edge on a source-vertex-side of the respective vertex as input data to a software service on a queried-vertex-side of the respective vertex; and responding to the received query with a value of the queried vertex, the value being a result of the controlled execution of the one or more software services respectively identified by the one or more labelled edges on the defined traversal path from the source vertex.

\* \* \* \* \*